United States Patent [19]

Ben-Arie

[11] Patent Number: 5,408,621
[45] Date of Patent: Apr. 18, 1995

[54] COMBINATORIAL DATA ENTRY SYSTEM HAVING MULTI-POSITION SWITCHES, EACH SWITCH HAVING TILTABLE CONTROL KNOB

[76] Inventor: Jezekiel Ben-Arie, 3100, S. Michigan Ave., Apt. 801, Chicago, Ill. 60616

[21] Appl. No.: 74,402

[22] Filed: Jun. 10, 1993

[51] Int. Cl.⁶ ............................................. G09G 3/02
[52] U.S. Cl. .................... 395/375; 400/485; 400/489; 400/492; 364/DIG. 1; 364/DIG. 2
[58] Field of Search ............. 400/485, 489, 482; 395/375; 364/237; 200/517

[56] References Cited

U.S. PATENT DOCUMENTS

| | | | |
|---|---|---|---|
| 2,393,781 | 1/1946 | Johnson et al. | 192/41 |
| 2,532,228 | 11/1950 | Hesh | 197/13 |
| 3,022,878 | 2/1962 | Seibel et al. | 197/19 |
| 3,633,724 | 1/1972 | Samuel | 197/100 |
| 4,029,915 | 6/1977 | Ojima | 200/5 A |
| 4,081,068 | 3/1978 | Zapp | 197/98 |
| 4,201,489 | 5/1980 | Zapp | 400/485 |
| 4,466,046 | 8/1984 | Cherry | 361/288 |
| 4,476,356 | 10/1984 | Nakayama et al. | 200/6 |
| 4,775,255 | 11/1988 | Langley | 400/485 |
| 4,913,573 | 4/1990 | Retter | 400/489 |
| 4,940,346 | 7/1990 | Liljenquist | 400/487 |
| 4,999,795 | 3/1991 | Lapeyre | 364/709.16 |
| 5,017,030 | 5/1991 | Crews | 400/485 |
| 5,119,078 | 6/1992 | Grant | 340/711 |

Primary Examiner—Robert B. Harrell
Assistant Examiner—Zarni Maung
Attorney, Agent, or Firm—Dressler, Goldsmith, Shore & Milnamow, Ltd.

[57] ABSTRACT

A combinatorial data entry system useful with a computing apparatus comprises two multi-position switches. A data entry system useful with a telephone comprises one multi-position switch. Each multi-position switch includes a control knob, which can be manually tilted between a rest position and any of twelve tilted positions and is biased to the rest position, and twelve switchable devices, which may be electrical, opto-electronic, capacitive, or magnetically activated. Electrical switching devices having stationary and movable contacts are preferred. In each multi-position switch, each switchable device has a deactivated state and an activated state and corresponds uniquely to one of the tilted positions of the control knob. Each switchable device has an active output when switched from the deactivated state into the activated state. Thus, as the control knob of each multi-position switch is tilted from the rest position into selected ones of the tilted positions, a selected one of the switchable devices is switched from the deactivated state into the activated state. Each possible combination of active outputs from all of the switchable devices of the multi-position switches represents a unique output of the combinatorial data entry system.

10 Claims, 4 Drawing Sheets

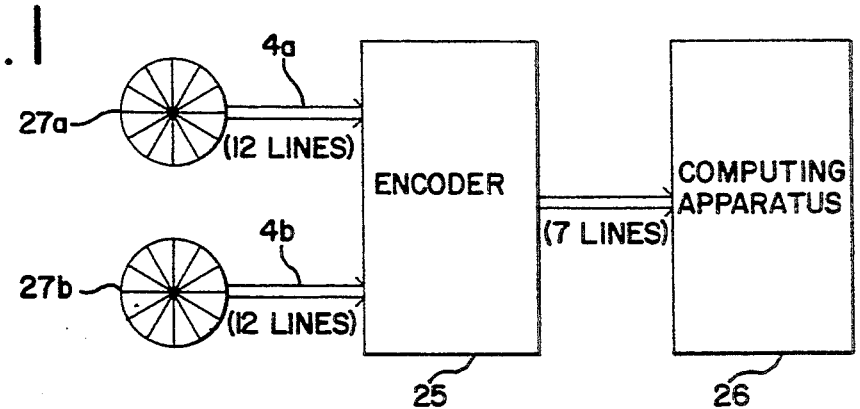
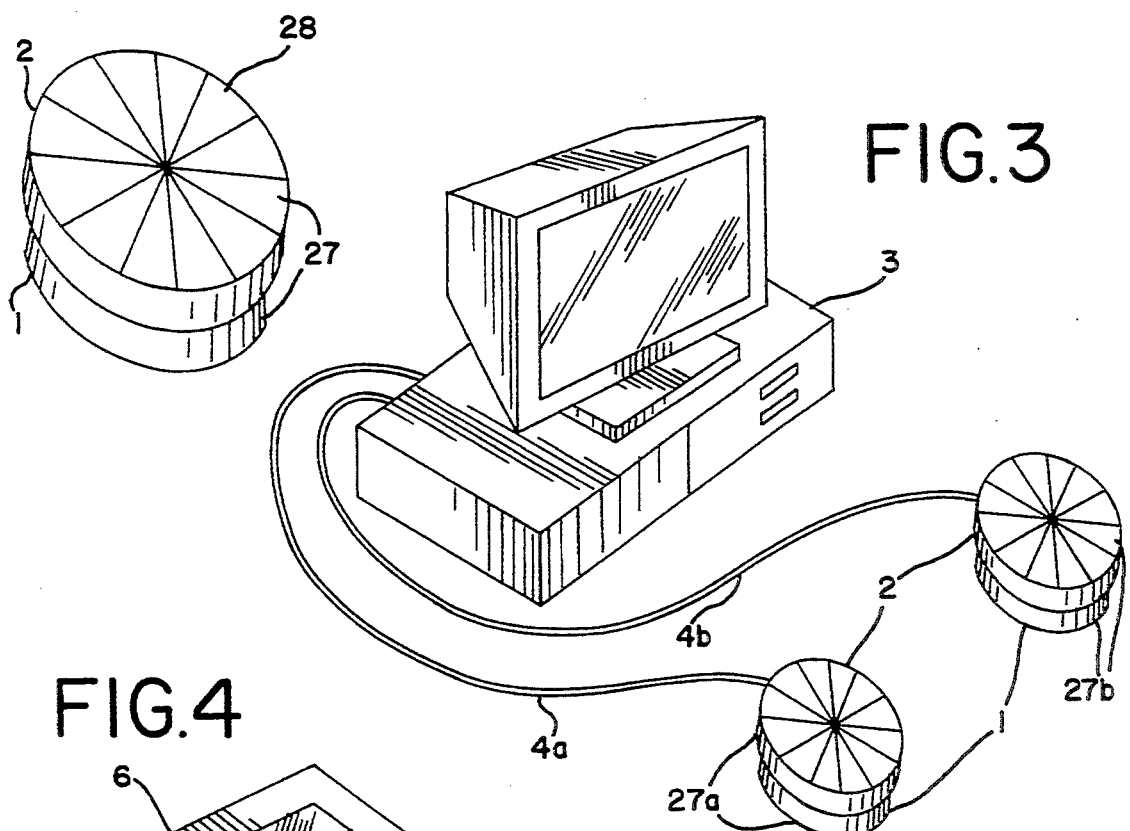
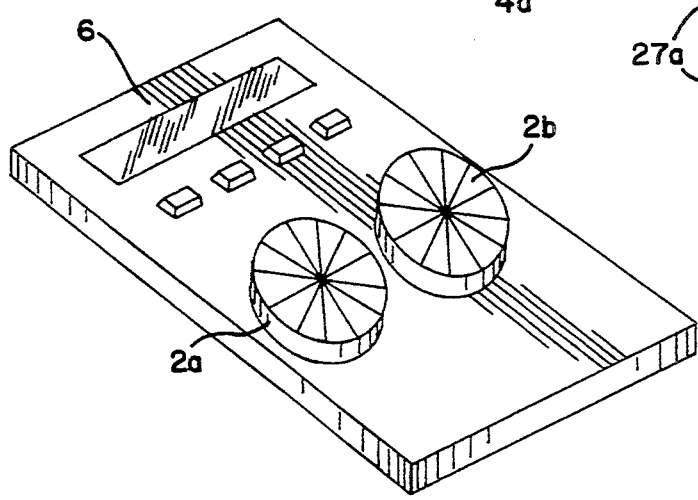

COMBINATORIAL DATA ENTRY SYSTEM HAVING MULTI-POSITION SWITCHES, EACH SWITCH HAVING TILTABLE CONTROL KNOB

REFERENCES CITED

U.S. Patent Disclosure Documents

U.S. Pat. No. 84,671 Jun. 19, 1991, by Jezekiel Ben-Arie

U.S. Pat. No. 96,567 Nov. 27, 1991, by Jezekiel Ben-Arie

U.S. Pat. No. 24,802 Feb. 10, 1993, by Jezekiel Ben-Arie

U.S. Patent Documents

U.S. Pat. No. 2,040,248 Dvorak
U.S. Pat. No. 4,244,659 Malt
U.S. Pat. No. 4,265,557 Runge
U.S. Pat. No. 4,917,516 Retter
U.S. Pat. No. 4,833,446 Eilam
U.S. Pat. No. 4,490,056 Whitaker
U.S. Pat. No. 4,067,431 Whitaker
U.S. Pat. No. 2,526,228 Hesh
U.S. Pat. No. 3,633,724 Wuenn
U.S. Pat. No. 4,584,443 Yaeger
U.S. Pat. No. 4,736,191 Matzke
U.S. Pat. No. 4,823,634 Culver
U.S. Pat. No. 4,799,049 Avila
U.S. Pat. No. 4,916,440 Faeser
U.S. Pat. No. 4,992,631 Gee
U.S. Pat. No. 4,931,781 Miyakawa
U.S. Pat. No. 4,476,356 Nakayama
U.S. Pat. No. 4,499,342 Nakayama
U.S. Pat. No. 4,975,547 Nakayama
U.S. Pat. No. 4,896,003 Hsieh
U.S. Pat. No. 4,687,200 Shirai
U.S. Pat. No. 4,408,103 Smith
U.S. Pat. No. 5,012,230 Yesuda
U.S. Pat. No. 4,246,452 Chandler
U.S. Pat. No. 4,428,649 Main

Foreign Patent Documents 2,076,743 Winklet

BACKGROUND OF THE INVENTION

1. Field of the Invention

This invention generally pertains to the field of manual data input systems. More particularly, the invention relates to combinatorial keyboards and other manual means for data entry in computer terminals, telephone dialing, digital calculators etc..

2. Description of the Related Art

Alphanumeric and control data entry to a computer and other digital machines may be accomplished in several ways using a variety of input devices. A traditional device for manual input is a typewriter keyboard which can be used to input alpha-numeric and control data directly into the computer. Keyboards are also used in a large variety of other digital systems such as: telephones, calculators and typewriter printers. Such keyboards are suggested in many shapes and forms. Widely mentioned in the literature are also touch pads which are just other type of keyboard devices, since they also employ a plurality of pressure locations.

All the keyboard based devices mentioned above suffer from a common drawback: all of them require a large number of keys that occupy a substantial area. In many recent lap-top computers the keyboard is even larger than the display screen. The main reason for the large number of keys in these devices, is that each key is used only for 2-3 input characters. For example, upper case characters and control characters are entered in standard keyboards by depressing two keys at the same time. Since the standard ASCII format used in computer terminals includes 128 different characters, even 3 characters per key still requires more than 40 keys. Another drawback of the standard keyboard is that the keys are arranged in straight rows on a plane, and no effort was made to make this standard arrangement more suitable for the human operator.

Furthermore, typing with a large number of keys requires frequent eye-hand coordination in order to find their location and frequently causes eye fatigue since the user's gaze must be repeatedly diverted from the screen to locate the keys. Some people solve this problem by exercising "blind" typing methods. But such methods require special training due to the large number of keys and are more error prone than non-blind typing methods. Even with eye-hand coordination, fast typing frequently results in many errors since it requires fast finger movements over substantial distances from key to key.

Many efforts have been made to modify the layout of keyboards. A modified keyboard with new assignment of keys was disclosed by Dvorak in U.S. Pat. No. 2,040,248. Malt in U.S. Pat. No. 4,244,659, suggested a curved arrangement for the keys that makes more use of the thumb which is used in standard keyboards only for operation of the space bar. A specific allocation of key for each finger is disclosed by Runge in U.S. Pat. No. 4,265,557. Runge suggested clusters of keys that are allocated for each finger. Each finger operates four keys in a narrowly defined location. Similar approach with five keys per finger was disclosed by Retter in U.S. Pat. No. 4,917,516. Retter placed the keys in finger wells on two ergonomically shaped mouse devices that are also used for cursor control. The keys are operated in left, right, forward, reverse and down directions. Another method was suggested by Winkler in the United Kingdom Pat. No. 2,076,743 where the data entry device employs pressure sensitive switches actuated by the finger knuckles. The systems of Dvorak, Malt, Runge, Winkler and Retter still do not significantly reduce the number of keys required, even though the confined location of operation for each finger alleviates the necessity for eye-hand control in the methods of Runge and Retter. However, these inventions require difficult actuation movements of the fingers especially in the left-right and forward directions. Such operations exert special strain on the muscles especially in left-right directions. The method of Winkler also requires special finger movements. Moreover, many people are not able to move their fingers independently in these directions. Operation of one finger often results in involuntary movement of neighboring fingers as well.

Efforts to reduce the number of keys were made in two major directions. The first direction is to reduce the key number by using key combinations for each character. The second direction employs pivoted keys where each key has multiple positions. The combinatorial approach is disclosed by Eilam in U.S. Pat. No. 4,833,446 where a combinatorial method with 8 keys that are operated by one hand was developed. In U.S. Pat. No. 4,490,056 and U.S. Pat. No. 4,067,431 by Whitaker disclosed a keyboard that has 12 keys. The combinatorial methods overcome the major two-combination limitation of the traditional on/off key by actuating more than one key per character. Various combinatorial and time sequential methods to encode the large number of characters were suggested. However, such methods are quite complicated to memorize and data entry is slow because each character requires a large sequence of manual operations. The major limitation of these methods is the requirement of many on-off keys which have only two positions per key, while our method uses only few multi-position switches with even greater number of combinations. Our approach also replaces the finger operated keys with the natural dexterity of wrists for multi-directional typing.

The second direction mentioned above was disclosed by Hesh in U.S. Pat. No. 2,526,228 where the keyboard was replaced by ten pivoting keys with five directions each. Similar approaches disclosed by Samuel in U.S. Pat. No. 3,633,724 and by Wuenn in Yaeger in U.S. Pat. No. 3,633,724 and by also suggest the same approach of multi-position finger keys that are worn on the fingers. The disadvantages of finger-operated pivoted keys are similar to the disadvantages of the above mentioned methods of the key clusters that are designated for each finger. Pivoted keys operated by fingers also entail difficult and independent movements of the fingers especially in the left-right and forward directions. Such operations exert special strain on the muscles. Moreover, many people are unable to move their fingers independently in lateral directions. Furthermore, such keyboards constrain the fingers to closely confined locations all the time and do not utilize the natural dexterity of the wrist and the arm.

To summarize, finger based methods still require a substantial number of keys, difficult finger movements, or complex sequential typing to encode the large number of characters that are required for alpha-numeric data entry. No effort was made in the above inventions to combine the multi-position keys with combinatorial methods in order to further reduce their total number. The above mentioned inventions also do not utilize the natural dexterity of the wrist and the arm and do not employ their capabilities for multi-directional movements.

Other means for inputting data which use directional manual input, such as: joystick, mouse, data tablets or directional touch pads (see for example, Matzke U.S. Pat. No. 4,736,191), are mainly designed for analog-continuous control input. This kind of input is chiefly required for cursor or pointer control on a terminal screen. In the U.S. Pat. No. 4,823,634 Culver disclosed a tactile device for cursor control based on a rotating cylinder journaled in a movable bar. A similar device was disclosed by Avila in U.S. Pat. No. 4,799,049.

Due to their finely quantized output, and the limited accuracy of human operators, such devices are unsuitable for manual entry of alpha-numeric data without additional visual feedback. In the U.S. Pat. No. 4,916,440, Faeser discloses a device that uses an analog joystick with visual feedback for entering alpha-numeric data. Such methods are extremely slow and ineffective.

Hence, for effective character inputing, the input means should not be of analog nature but should be discrete and should put into use the natural attributes of the human hand especially the wrist and arm capabilities for accurate directional movements. This calls for an entry system with preferably only two hand-operated control knobs with multiple positions that are actuated by discrete directional movements. In addition, such system should be combinatorial in order to achieve a maximum number of input characters with a minimal number of control knob positions. In order to encode the 128 different characters defined in the standard ASCII code with only two hand-operated control knobs, each key should have at least 12 discrete positions which generate $12 \times 12 = 144$ input combinations.

Directional, hand-operated input devices, such as multi-position switches or joysticks, that were disclosed, are not suitable for fast directional actuation or have much fewer positions than are required. Typically, such devices have only few input positions (usually four) and are specifically designed for remote control applications such as positioning the vertical and horizontal axes of cursors, rearview mirror adjustments or TV games, and not for manual alpha-numeric data entry. These multi-position switches often include a plurality of contact pairs printed on a PC board that are designated as the switch terminals. Superimposed over each contact pair is a corresponding movable contact usually made of conductive material which is attached to a resiliently deformable diaphragm. When the diaphragm is depressed at the location of the switch terminals the movable contact touches the switch terminals and activates the switch. The diaphragm is depressed by a movable member that is tilted about a central gymball or other central support. Usually the movable member has the shape of a control knob or a joystick.

Typical representations of such devices are disclosed in the U.S. Pat. Nos.: 4,992,631 by Gee, 4,931,781 by Miyakawa, 4,476,356, 4,499,342 and 4,975,547 by Nakayama, 4,896,003 by Hseih, 4,687,200 by Shirai, 4,408,103 by Smith, 5,012,230 by Yesuda, 4,246,452 by Chandler, 4,428,649 by Main.

In order to reduce the total number of parts in such switches, the movable member is restored to a neutral position by the same resilient diaphragm that is used for the movable contacts. Such an arrangement appears in the above mentioned patents by Gee, Hsieh, Nakayama, Shirai and Smith, and causes increased friction and wear. The effort for parts reduction also caused the designers to use central supports for the movable members that are a part of the casing, and therefore have a considerable amount of slack or play. The movable member has considerable sliding effects in addition to its tilting motion. This results in inaccurate actuation of the switches. In addition, except for U.S. Pat. No. 4,975,547 by Nakayama, no effort has been made in the above patents to delimit the tilting motions of the movable member if pressure is applied in intermediate directions. In such cases, two switches might be activated simultaneously. This effect is utilized in the patent by Chandler to encode intermediate directions. However, such an effect is not reliable enough due to the inaccuracy of the tilting mechanism and flexibility of the resilient material. In summation, the structure of the switching devices described above, is unsuitable for accurate multi-position switches with more than four positions. Such a switch requires more accurate tilting and switching mechanisms.

SUMMARY OF THE INVENTION

A major objective of this invention is to provide a data entry system for efficient input of alpha-numeric and control characters that has a small number of manual multi-position switches.

It is another major objective of this invention to provide a method to combinatorially generate a complete alpha-numeric and control character set by the inputs of these multi-position switches.

It is an additional objective of this invention to provide a data entry system that utilizes the directional dexterity of the wrists and the arms, and does not necessitate visual feedback (hand-eye coordination).

Yet another objective of the invention is to overcome the problems of the prior data entry systems which require a large number of keys and the substantial space they occupy.

It is a further objective of this invention to provide a display method applicable to digital display terminals, that facilitates the operation of the proposed data entry system.

It is yet an additional objective of this invention to provide a multi-position switch operated by tilting of a control knob which is attached to a reliable and accurate mechanism that facilitates fast and low friction operation.

It is a further objective of this invention to provide a multi-position switch operated by tilting of a control knob which has a reliable means for delimiting intermediate tilting movements of the key and therefore enables a reliable and independent actuation of a substantial number of contacts, each actuated by another tilting direction.

This invention achieves these objectives with a relatively small manual system which typically includes two directional control knobs which can replace a complete alpha-numeric keyboard system.

The preferred embodiment of the invention is based on two major principles: (i) the human capability for fine directional discrimination, both in manual and visual control, and (ii) the combinatorial multiplicity generated by multi-position switches. Thus, the principle of operation that underlies this invention is to select one out of 12 input combinations with a single control knob by pressing it in one out of 12 equiangular directions. These directions are easily discriminated by humans and are traditionally used in analog watches. If more than 12 input combinations are desired, two control knobs are operated simultaneously to generate $12 \times 12 = 144$ input combinations. Controlling these two knobs does not require eye-hand coordination and thus eliminates eye fatigue.

The preferred embodiment of the invention comprises a data input system that includes one or more manually actuated, direction sensitive input devices named here as Dodecagons. The Dodecagon comprises a Dodecagon-shaped control knob which is mounted on a ball bearing means, a base that holds the socket of the ball bearing and means for delimiting the angle of tilt of the control knob and also constraining it to only 12 directions when the knob is in a tilted position. The base also houses an annular PC board covered by a matching annular flexible diaphragm. These annulae house 12 electrical switches that are equally spaced on the ring's center circumference. Each switch is composed of a movable-upper contact that is supported by a flexible diaphragm and an opposite static-lower contact on the PC board. Normally, in an undepressed position, all the opposite contacts are open and all the switches are in an "off" position. Twelve spring loaded movable plungers are mounted in cavities on the lower side of the control knob at locations which correspond to the switches. Other cavities in the lower face of the control knob hold 4–6 springs that are pressed against opposite cavities in the base. These springs restore the control knob into a horizontal, neutral-level position of rest when the knob is not tilted.

The lower surface of the control knob has the shape of a dodecangular pyramid (with 12 equal faces) with obtuse vertex angle. When the control knob is tilted, it tilts until one of the pyramidal faces is pressed flat, parallel against the upper surface of the base which has the shape of a planar ring. Since at one time, only one face of the pyramid can be parallel to a plane, the control knob has exactly 12 stable positions when it is tilted. When the user depresses the control knob at a certain direction, the knob finally rests in one tilted stable position which is the most closest to the user's original direction. This guarantees that if the user directional accuracy is better than $\pm 15$ degrees, the knob will rest at the user's desired position.

In such a stable tilted position, only one out of the 12 plungers applies sufficient pressure on the contact, thus closing the switch's contacts and turning this switch into an "on" position. Meanwhile, all the other 11 switches remain in an undepressed "off" position. When the control knob is released, all the 12 switches are in an "off" position.

In the preferred embodiment described here, the switches used are electrical switches. However, with minor changes one could use opto-electronic, capacitive or magnetically activated switches.

The Dodecagon is capable of momentarily generating 12 different electrical outputs. Hence, a single Dodecagon is equivalent to 12 keyboard keys and thus can be used for telephone dialing which requires ten numerals, pawn and star characters. A system with two Dodecagons has $12 \times 12 = 144$ input combinations. This allows for manual entry of significantly more than the 128 alpha-numeric, typing and control characters that are defined in the ASCII format. Such a system which includes only two control knobs, can replace a complete computer keyboard. To type a character with this system, one has to actuate both Dodecagons simultaneously.

A two-axis analog joystick can also be used to encode the required 12 orientations. This is done by quantizing and decoding the joystick orientation into the nearest of the 12 required orientations.

To facilitate head-up typing with a two Dodecagon system connected to a computer terminal, an additional on-line graphics is suggested. The graphics can be displayed on the terminal's screen along with other data. The graphics consist of a drawing of a Dodecagon with 12 characters indicated on its vertices. Such a display appears on the screen when one of the system's Dodecagons is actuated and the user identifies the optional characters that are available by positioning the other Dodecagon. Similar information can be indicated on an instruction card that includes all the 144 combinations.

BRIEF DESCRIPTION OF THE DRAWINGS

The properties, features and advantages of the present invention will become more apparent from the preferred embodiments in the following drawings:

FIG. 1 is a schematic diagram of an Alpha-Numeric Combinatorial Data Entry System (ANCDES) using two Twelve-Position Switches (TPSs) that are connected through a combinatorial encoder to a computing apparatus.

FIG. 2 is a perspective view of a twelve-position switch (also called Dodecagon).

FIG. 3 is a perspective view of two twelve-position switches used as an alpha-numeric data entry device instead of a keyboard in a computer terminal.

FIG. 4 is a perspective view of two twelve-position switches used as an alpha-numeric data entry device instead of a keyboard in a calculator.

DETAILED DESCRIPTION OF A PREFERRED EMBODIMENT OF THE INVENTION

Figure 5:
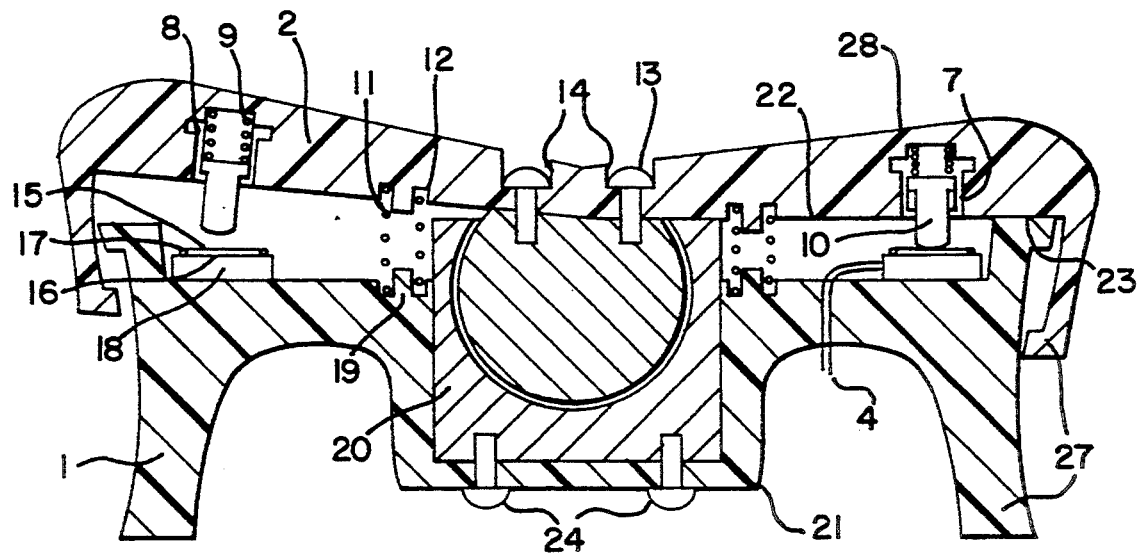
FIG. 5 is a sectional view of the twelve-position switch in a tilted position (tilted towards the right hand side).

Reference should be made to the drawings of the preferred embodiment of the Alpha-Numeric Combinatorial Data Entry System (ANCDES) and the multi-position switch in which the same reference numbers are used through out the different figures to designate the same components. In some instances, letters are appended to the component numbers in order to differentiate between identical parts which have different operational roles.

FIG. 1 shows a preferred embodiment of an Alpha-Numeric Data Entry System (ANCDES) that consists of two Twelve-Position Switches (TPSs) 27a and 27b connected to a combinatorial encoder 25 which has twelve input lines connected to the electrical outputs of TPS 27a and twelve input lines from TPS 27b The encoder converts these 24 input lines into a 7-bit ASCII code which is then transmitted to the computing apparatus 26. Hence, in the preferred embodiment, with only two TPSs, one could replace a keyboard with more than one hundred keys. The same principle of combinatorial data entry can be applied to any number of multi-position switches with any multiplicity of positions. Furthermore, the encoder could be parallel to serial encoder with only one output line. In another preferred embodiment, the encoder is eliminated and the electrical outputs of the TPSs are connected directly to the computer which performs the encoding by software.

Whenever one of the TPSs is tilted, one of its twelve electrical outputs is activated. When the two TPSs 27a and 27b are tilted simultaneously, the combinatorial encoder 25 detects two activated lines and generates a coded output (e.g. 7-bit ASCII) which represents the selected alpha-numeric input to the computing apparatus 26. The number of input combinations available with this scheme is the total product of the number of positions of each individual TPS, which in the case of two TPSs amounts to 12×12=144 input combinations. Each combination which represents an input character, is generated when the two TPSs are tilted in combination. An additional 24 combinations may be added for a total of 168 combinations $=(L+1)^M-1$ (if one also adds single TPS tilting), where L is the number of positions of the Multi-Position Switch (MPS) MPS (12 in the case of the TPS) and M is the number of MPSs (2 in the preferred embodiment). The twelve positional arrangement in each switch allows an easy manual operation of the TPSs since each position requires to tilt the control knob 2 in one out of 12 directions. In the preferred embodiment of the MPS, i.e. the TPS, the directions are 30 degrees apart and thus are easily discriminated. The upper surface 28 of the TPS's control knob 2 is shaped as a concave twelve-sided regular pyramid (with 12 equal faces) with a very obtuse central apex. This shape helps to guide the operator's hand into the correct directions. Since people are already quite familiar with the 12-directional configuration which is widely used for a long time in watches, they can easily learn to operate the TPS without visual feedback. This will facilitate "blind" typing with the ANCDES without any extensive training. Similar design can be implemented for other numbers of positions in the MPS such as 8, 10 or 16 positions.

FIG. 2 illustrates a preferred embodiment of a TPS which is a TPS 27 having a top part called control knob 2 and a bottom part called base 1. The control knob 2 has a shape of a concave 12-faced pyramid with obtuse apex on its upper surface 28 to facilitate easy directional typing. Tilting the switch in each direction activates one out of twelve output lines.

FIG. 3 displays a typical embodiment of the ANCDES. Data entry to computer 3 is performed via two TPSs 27a and 27b which are connected through 12-line cables 4a and 4b. Effective data entry of 144 alpha-numeric or control characters is enabled here with only two TPSs tilted in combination. As was already mentioned, if the combinations also include only one TPS tilted and the other in rest position, the number of input characters is increased to 168.

FIG. 4 displays another typical embodiment of the ANCDES. Here, two miniature versions of the TPSs, whose control knobs 2a and 2b are visible, are used for data entry into a calculator 6. This method can significantly reduce the size of pocket calculators, since the panel area which is required for the two TPSs is much smaller than the many keys they can replace.

Figure 6:
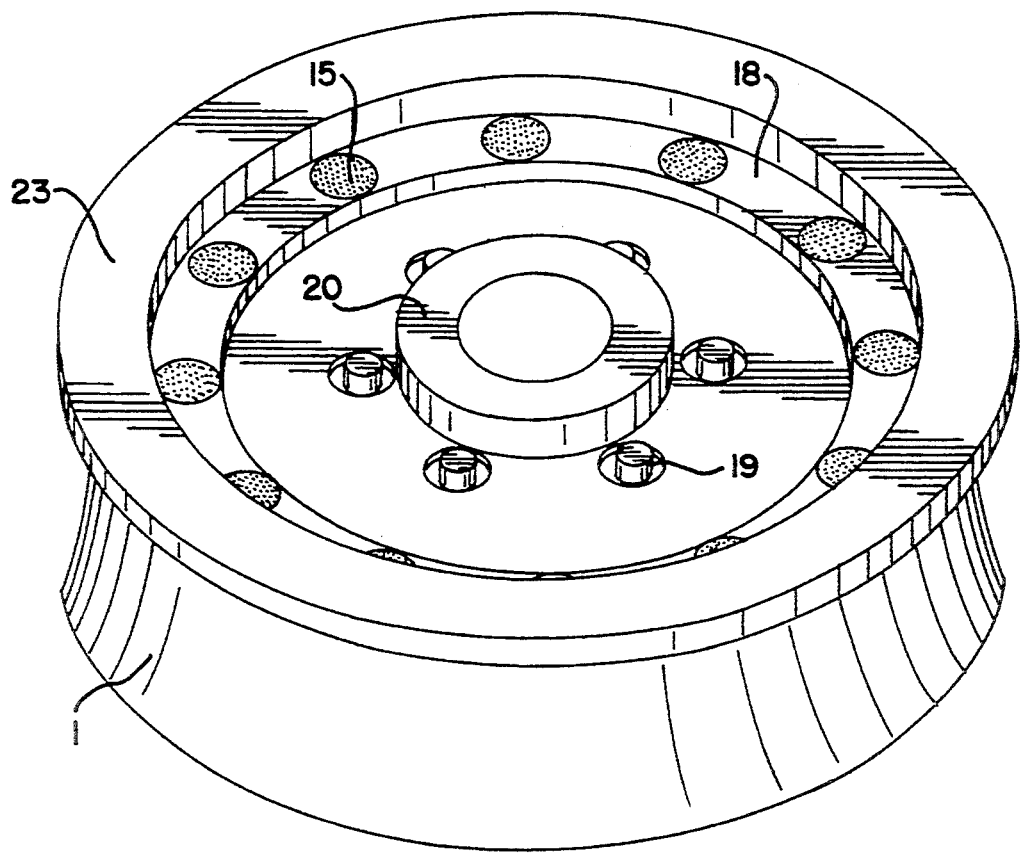
FIG. 6 is a top perspective view of the bottom part (called base) of the twelve-position switch.
Figure 7:
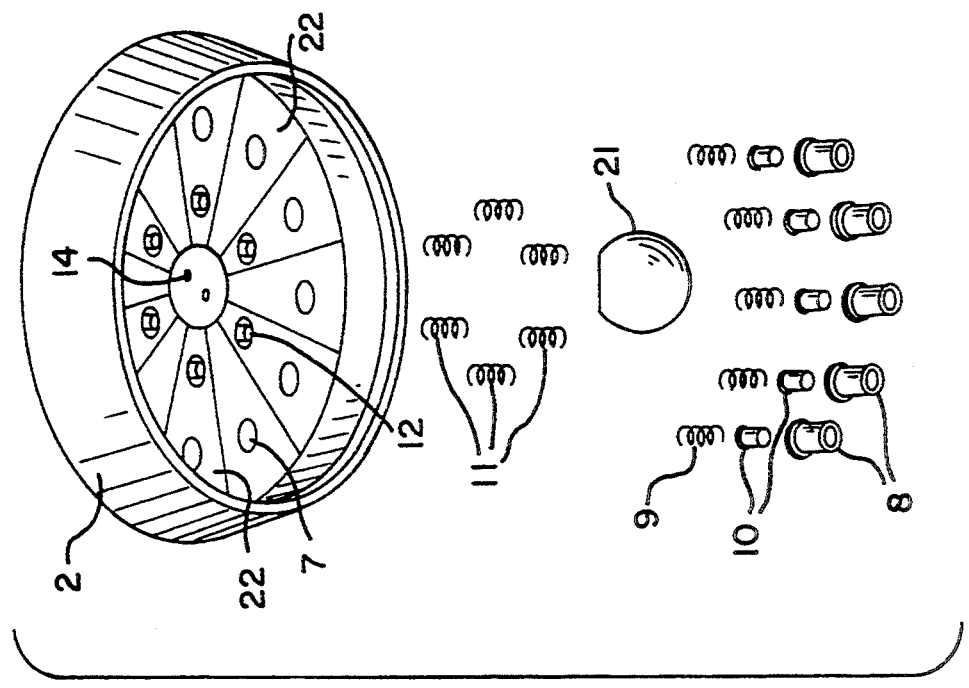
FIG. 7 is an exploded perspective bottom view of the top part of the twelve-position switch (called control knob).

FIG. 5 is a sectional view of the TPS 27. The TPS 27 consists of two major parts: a top part 2 called control knob, and a bottom part 1 called base. FIG. 6 illustrates a top perspective view of the base 1. FIG. 7 is an exploded perspective bottom view of the control knob 2.

The control knob 2 can be tilted in any direction since it is supported by a ball 21 which is fitted into a socket 20. The socket 20 is attached to the base 1 by screws 24, and the ball 21 is attached to the control knob 2 by screws 13 via holes 14. Both the screws 24 and 13 can be eliminated if one attaches the socket 20 to the base 2 and the ball 21 to the control knob 2 using glue. A ball bearing arrangement enables accurate and smooth tilting of the control knob in all directions. Six springs 11 which rest on one side in wells 12 in the control knob 2 and on the other side in wells 19 in the base 1. Both wells 11 and 19 are arranged in equidistant circular configurations. The springs 11 keep the control knob in a horizontal position when the control knob is not tilted (i.e. is in rest position). The movable contacts 15 are printed on the lower side of a resilient membrane which rests on an insulating spacer 17. The movable contacts 15 are arranged in an equidistant circular configuration. The spacer 17 is attached on its lower side to the printed circuit board (PCB) 18. Each movable contact 15 has a corresponding stationary contact 16 below it, which is mounted on the upper side of PCB 18. The stationary contact 16 has two isolated conductors. When movable contact 15 is depressed it touches the stationary contact 16 and electrically connects the two isolated conductors of stationary contact 16 below it, thus activating one of the 12 output lines of the TPSs. Cable 4 interfaces all the twelve contacts of the TPS with the encoder 25.

Twelve plastic plungers 10 are installed along with springs 9 in the plastic shells 8, which are snap-fitted into the holes 7 in the lower face of the control knob 2. The holes 7 correspond to the movable contacts 15 and thus are also arranged in the same equidistant circular configuration. In FIG. 7 only five plungers 10, springs 9 and shells 8 are shown to avoid overcluttering the figure. The spring 9 forces the plunger 10 outwards through the opening in shell 8 and when the control knob 2 is tilted, the plunger 10 depresses the movable contact 15 and retracts, thus causing the the spring 9 to contract. This limits the pressure of the plunger 10 on the contact 15. The control knob 2 has a 12-faced regular pyramidal (equally faced) surface, both on its lower face 22 and on its upper face 28. The upper face 28 is a concave 12-faced regular pyramid with obtuse vertex which facilitates easy directional typing. The lower face 22 is a convex 12-faced regular pyramid with obtuse vertex which serves as a guide and delimiter for the tilting action of the control knob 2. When the control knob 2 is completely tilted, only one face of the lower 12-faced pyramid 22 rests on the planar surface 23 of the base 1, and thus guides the stable position of the control knob 2 only to one out of the twelve desired tilted positions.

Figure 8:
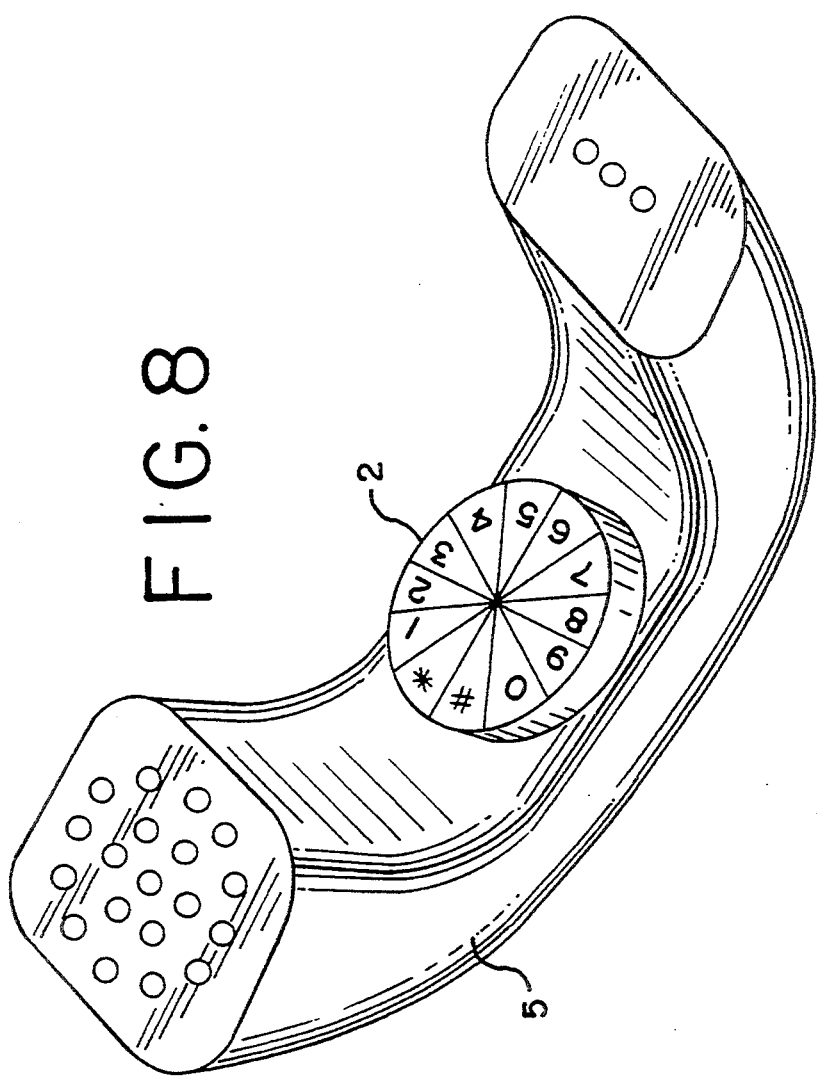
FIG. 8 is a view of a twelve-position switch that is used as a dialing device instead of a numeric keypad in a telephone.

FIG. 8 illustrates another application of the TPS 27 for dialing a input for a telephone 5. In this implementation, the TPS exactly replaces the conventional 12 button keypad.

Although the electrical switches illustrated in FIG. 2 and described above are preferred, it is contemplated by this invention that other switchable devices such as opto-magnetically activated, or capacitive switches may be alternatively employed in each TPS.

Figure 10:
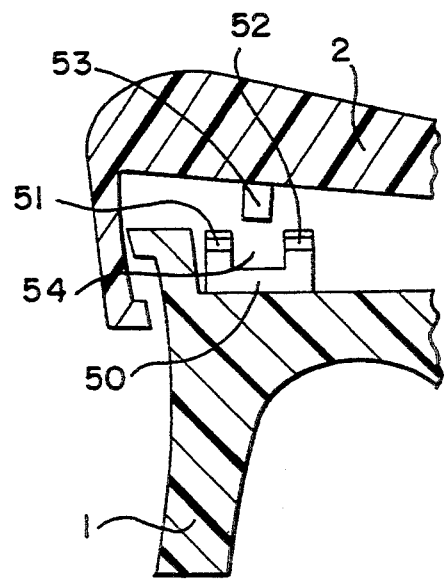
FIG. 10 is a sectional view of an alternative, opto-electronic, multi-position switch.

As shown in FIG. 10, an opto-electronic switch 50 that may be alternatively employed comprises a light-emitting diode 51 mounted on the base 1 of the TPS and a photo detector 52 mounted on the base 1 of the TPS so as to face the light-emitting diode 51 and separated from the light-emitting diode 51 by a slot 54. The photo detector 52 is arranged to receive light emitted by the light-emitting diode 50, to be activated by light emitted by the light-emitting diode 50 when the slot 54 is blocked, and to be deactivated when the slot 54 is not blocked. The opto-electronic switch 50 further comprises a blocking peg 53 extending from a lower surface of the control knob 2 of the TPS. The blocking peg 53 is arranged to block the slot 54 separating the light-emitting diode 52 from the photo detector 52 when the control knob 2 of the TPS is tilted into the tilted position corresponding to the opt-electronic switch 50.

Figure 11:
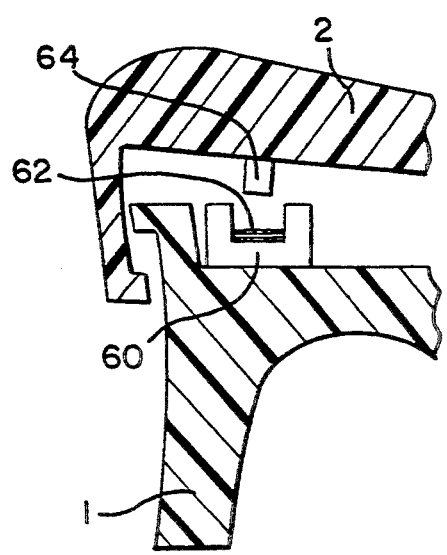
FIG. 11 is a sectional view of an alternative, magnetically activated, multi-position switch.

As shown in FIG. 11, a magnetically activated switch 60 that may be alternatively employed comprises a magnetic field detector 62 mounted on the base 1 of the TPS and a magnet 64 housed by the control knob 2 of the TPS. The magnetic field detector 62 is arranged to be activated when a magnetic field is present. The magnet 64 is arranged to activate the magnetic field detector 62 when the control knob 2 of the TPS is tilted into the tilted position corresponding to the magnetically activated switch 60.

Figure 9:
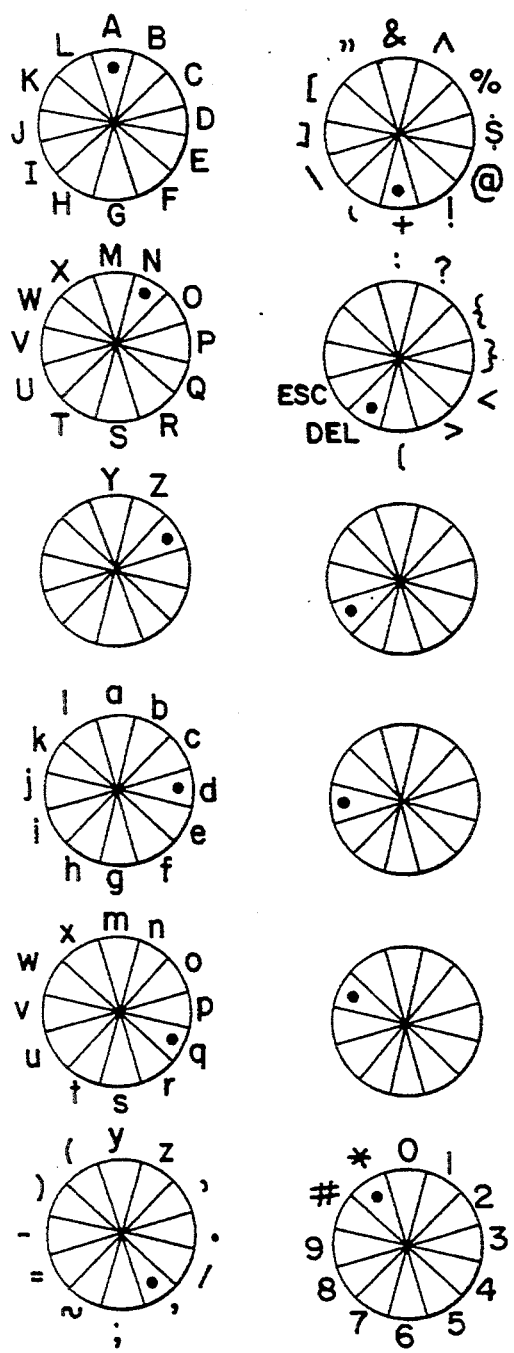
FIG. 9 is a chart which describes part of the character combinations that are feasible by tilting two twelve-position switches in combination.

FIG. 9 is chart that describes part of the input character combinations that are available from two TPSs. The figure illustrates 12 top views of the upper 12-faced regular pyramid 28. The black dot denotes the tilting direction of one TPS while the letters around each pyramid denote the input character generated when the second TPS is tilted in the corresponding direction. Note that many of the combinations are still vacant and can be used for special input characters or functions illustrates another application.

While specific embodiments of the invention have been shown and described in detail to illustrate the application of the principles of the invention, it will be understood that the invention may be embodied otherwise without departing from such principles.

I claim:

1. A combinatorial data entry system useful with a computing apparatus and comprising a plurality of multi-position switches, each multi-position switch including
   (a) a base,
   (b) a control knob mounted on the base so as to be manually tiltable between a rest position and any of a specific number of tilted positions and biased to the rest position,
   (c) switchable devices mounted on the base in a number equal to the specific number of tilted positions, each switchable device having a deactivated state and an activated state and corresponding uniquely to one the tilted positions of the control knob, each switchable device having an active output when switched from the deactivated state into the activated state, and
   (d) means for switching a selected one of the switchable devices from the deactivated state into the activated state when the control knob is tilted from the rest position into a selected one of the tilted positions, each tilted position corresponding uniquely to one of the switchable devices,
the multi-position switches being arranged in said system so that each possible combination of active outputs from the switchable devices of the multi-position switches, when each of at least two of the control knobs is tilted to one of the tilted positions of said control knob, represents a unique output of the data entry system.

2. The combinatorial data entry system of claim 1 wherein the specific number is the same number for every multi-position switch.

3. The combinatorial data entry system of claim 2 comprising exactly two of the multi-position switches, each multi-position switch having exactly twelve tilted positions, into which the control knob of said multi-position switch is tiltable, each multi-position switch having exactly twelve switchable devices.

4. The combinatorial data entry system of claim 1 wherein each switchable device of each multi-position switch is electrical and comprises a stationary contact and a movable contact, the stationary contact being mounted on the base of said multi-position switch in a stationary position, the movable contact being mounted on the base of said multi-position switch so as to be normally out of contact with the stationary contact and being movable into contact with the stationary contact, and wherein the switching means of each multi-position switch is arranged to move the movable contact of a selected one of the switching devices of said multi-position switch into contact with the stationary contact thereof when the control knob thereof is tilted into the corresponding tilted position.

5. The combinatorial data entry system of claim 4 wherein the switching means of each multi-position switch comprises a separate plunger associated with each switchable device of said multi-position switch, mounted to and tiltable with the control knob of said multi-position switch, and arranged to move the movable contact of the switchable device associated therewith into contact with the stationary contact of the switchable device associated therewith when the control knob having the separate plunger mounted thereto is tilted into the corresponding tilted position.

6. The combinatorial data entry system of claim 5 wherein the separate plungers are mounted to the control knobs so as to be movable toward and away from the movable contacts and are biased toward the movable contacts.

7. The combinatorial data entry system of claim 4 wherein the stationary contact of each switching device comprises two conductors insulated from each other and the movable contact of said switching device is arranged to connect the conductors when moved into contact with the stationary contact of said switching device.

8. The combinatorial data entry system of claim 1 wherein each switchable device of each multi-position switch is opto-electronic and comprises a light-emitting diode mounted on the base of said multi-position switch and a photo detector mounted on the base of said multi-position switch so as to face the light-emitting diode, separated from the light-emitting diode by a slot, and arranged to detect light emitted by the light-emitting diode, to be activated when the slot is blocked, and to be deactivated when the slot is not blocked, and a blocking peg extended from a lower surface of the control knob of said multi-position switch and arranged to block the slot separating the light-emitting diode from the photo detector when the control knob of said multi-position switch is tilted into the tilted position corresponding to said switchable device.

9. The combinatorial data entry system of claim 1 wherein each switchable device of each multi-position switch is magnetically activated and comprises a magnetic field detector mounted on the base of said multi-position switch and arranged to be activated when a magnetic field is present and further comprises a magnet housed by the control knob of said multi-position switch and arranged to activate the magnetic field detector when the control knob of said multi-position switch is tilted into the tilted position corresponding to said switchable device.

10. The combinatorial data entry system of claim 1 wherein a lower surface of the control knob of each multi-position switch is shaped as a frustum of a pyramid having multiple faces, each of which corresponds to one of the tilted positions of the control knob thereof, and wherein the base thereof has a planar, upper surface, which is arranged to engage only one of the faces at any one time so as to guide the control knob thereof into a corresponding one of the tilted positions of the control knob thereof.

* * * * *